US009325986B2

(12) United States Patent
Howe et al.

(10) Patent No.: US 9,325,986 B2
(45) Date of Patent: Apr. 26, 2016

(54) TRANSIENT VIDEO ANOMALY ANALYSIS AND REPORTING SYSTEM

(71) Applicant: Mariner Partners, Inc., Saint John, New Brunswick (CA)

(72) Inventors: Curtis I. Howe, Hampton (CA); James Martin G. Harris, Calgary (CA); Aleksander Petrovic, Calgary (CA); Stephen W. Lesbirel, Rothesay (CA)

(73) Assignee: Mariner Partners, Inc., Saint John, New Brunswick (CA)

( * ) Notice: Subject to any disclaimer, the term of this patent is extended or adjusted under 35 U.S.C. 154(b) by 563 days.

(21) Appl. No.: 13/721,829

(22) Filed: Dec. 20, 2012

(65) Prior Publication Data

US 2013/0111535 A1    May 2, 2013

Related U.S. Application Data

(63) Continuation of application No. 12/264,687, filed on Nov. 4, 2008, now Pat. No. 8,339,968, which is a continuation of application No. PCT/CA2006/001922, filed on Nov. 23, 2006.

(60) Provisional application No. 60/746,603, filed on May 5, 2006.

(51) Int. Cl.
*H04L 12/26* (2006.01)
*H04N 17/00* (2006.01)
*H04L 29/06* (2006.01)
*H04L 12/24* (2006.01)
(Continued)

(52) U.S. Cl.
CPC .......... *H04N 17/004* (2013.01); *H04L 12/2602* (2013.01); *H04L 29/06027* (2013.01); *H04L 41/069* (2013.01); *H04L 41/0631* (2013.01); *H04L 41/0677* (2013.01); *H04L 41/147* (2013.01); *H04L 43/00* (2013.01); *H04L 65/604* (2013.01); *H04L 65/80* (2013.01); *H04N 19/159* (2014.11); *H04N 19/172* (2014.11); *H04N 19/44* (2014.11); *H04N 19/89* (2014.11); *H04N 21/2404* (2013.01); *H04N 21/4425* (2013.01); *H04N 21/44209* (2013.01); *H04N 21/64322* (2013.01); *H04L 43/0829* (2013.01)

(58) Field of Classification Search
None
See application file for complete search history.

(56) References Cited

U.S. PATENT DOCUMENTS 5,874,992 A    2/1999  Caporizzo
6,281,929 B1   8/2001  Fimoff
(Continued)

FOREIGN PATENT DOCUMENTS

JP    2006033722 A    2/2006
WO       0210944 A1   2/2002

OTHER PUBLICATIONS

International Search Report and Written Opinion from PCT/CA2006/001922, mailed on Mar. 1, 2007.
(Continued)

*Primary Examiner* — Kevin C Harper
(74) *Attorney, Agent, or Firm* — BainwoodHuang

(57) ABSTRACT

A system and method for detecting and analyzing transient video anomalies in AV broadcast networks includes AV signal monitors associated with each decoding device in the network for monitoring AV signals received by their associated video decoding device for detecting signal anomalies which are outside predetermined signal parameter levels during normal operation of the broadcast network.

15 Claims, 12 Drawing Sheets

(51) Int. Cl.
*H04N 21/442* (2011.01)
*H04N 21/4425* (2011.01)
*H04N 21/643* (2011.01)
*H04N 21/24* (2011.01)
*H04N 19/159* (2014.01)
*H04N 19/172* (2014.01)
*H04N 19/44* (2014.01)
*H04N 19/89* (2014.01)

(56) References Cited

U.S. PATENT DOCUMENTS

| | | | |
|---|---|---|---|
| 6,414,960 | B1 | 7/2002 | Kuhn et al. |
| 6,819,924 | B1 | 11/2004 | Ma et al. |
| 7,058,048 | B2 | 6/2006 | Clark |
| 7,075,981 | B1 | 7/2006 | Clark |
| 2001/0011375 | A1* | 8/2001 | Yun ............................... 725/107 |
| 2002/0007492 | A1* | 1/2002 | Smyth et al. ................... 725/107 |
| 2002/0073355 | A1* | 6/2002 | Cerami et al. ..................... 714/4 |
| 2002/0149675 | A1 | 10/2002 | Abraham et al. |
| 2003/0121053 | A1 | 6/2003 | Honda |
| 2003/0206721 | A1 | 11/2003 | Gotoh et al. |
| 2003/0226059 | A1* | 12/2003 | Braun ............................. 714/20 |
| 2004/0078743 | A1 | 4/2004 | Jensen et al. |
| 2005/0089104 | A1 | 4/2005 | Kim |
| 2005/0120124 | A1 | 6/2005 | Korhonen |
| 2005/0183130 | A1* | 8/2005 | Sadja et al. .................... 725/107 |
| 2006/0031905 | A1 | 2/2006 | Kwon |
| 2007/0033446 | A1 | 2/2007 | Tinkler et al. |
| 2011/0164140 | A1 | 7/2011 | Venna et al. |

OTHER PUBLICATIONS

"Summons to attend oral proceedings pursuant to Rule 115(1) EPC," for European Application No. 06817655.1, dated Apr. 1, 2014.

* cited by examiner

TRANSIENT VIDEO ANOMALY ANALYSIS AND REPORTING SYSTEM

CROSS REFERENCE TO RELATED APPLICATIONS

This application is a continuation of U.S. patent application No. 12/264,687 filed Nov. 4, 2008 and issued Dec. 25, 2012 as U.S. Pat. No. 8,339,968, which is a continuation of application no. PCT/CA2006/001922, filed on Nov. 23, 2006, and claims the benefit of U.S. Provisional Application No. 60/746,603 filed on May 5, 2006, which is incorporated herein by reference.

BACKGROUND OF THE INVENTION

Field of the Invention

The present invention relates in general, to digital broadcast communication systems, and, more specifically, to the monitoring of AV signal quality in broadcast communications systems.

Broadcast video industries have always been concerned with the quality of their service. With analog technologies, ensuring quality required periodic testing of significant paths for loss of signal strength (attenuation) and for signal to noise ratio (SNR). The network architecture, the quality of network elements (including connection points) and the distance a signal travels all effect both the attenuation of the signal and the SNR with a proportional effect on received Audio/Video (AV) quality. Therefore, service providers strived to have as high an AV quality as possible in the head-end. Still, the service provider was operating blind with respect to the actual AV quality received in the home and each home theoretically received a different picture quality.

With digital Audio/Video (AV) technologies, the AV quality is not proportionally linked to the attenuation and/or SNR of the underlying signal. However, as attenuation increases and SNR decreases, eventually, even with data correction, digital data packets will be lost or corrupted which will adversely impact the AV quality of AV signals received by a subscriber. The advantage of digital AV distribution is that, as long as no data is lost in transit, the AV quality received by all consumers is the same as that at the head-end regardless of distance, attenuation and SNR in the individual paths. However, any data packet loss will corrupt or break up the picture leading to a new type of AV quality problems experienced by the subscriber known as digital transmission artifacts. Due to digital transmission artifacts, a service provider still operates in the dark with respect to the quality of the service received by each customer/subscriber.

It is into this field of digital AV distribution that a solution is required to enable a service provider to have access to the transmission success of their digital AV services in each and every subscriber's home. Given 100% transmission success the subscriber will receive an AV quality equal to that at the head-end.

SUMMARY OF THE INVENTION

The present invention seeks to provide a system and method in which service quality information relating to the service reception quality of received video services by service providers' customers is collected and aggregated in a scaleable manner by a central management server, which in turn logs, analyses, and provides proactive and reactive support, diagnostics and troubleshooting of the AV service applications.

One aspect of the embodiments disclosed herein is generally defined as an AV signal monitoring agent, comprising a monitor operable in the Transport Layer of a digital broadcast network, implementing the ISO open system interconnect network model, for inferring Audio/Video (AV) quality of AV signals at the Application Layer of the broadcast network; the monitor being operable to continuously perform one or more tests of each AV signal during normal operation of the broadcast network to detect anomalies which exceed predetermined parameters in AV signals transmitted on the broadcast network and received by the monitor.

Another aspect of the disclosed embodiments is generally defined as a transient video anomaly analysis and reporting system for detecting, analyzing and reporting anomalies in AV broadcast networks having a head-end which transmits encoded AV signals over a distribution infrastructure and destination video decoding devices for receiving and decoding the AV signals and outputting an audio signal and a video signal, comprising an AV signal monitor in each decoding device for continuously monitoring AV signals received at an associated decoding device for detecting signal anomalies, during normal operation of the broadcast network, which exceed predetermined parameters and for outputting a report of detected anomalies; a database for storing report data; a management server connected to the monitors over the broadcast network for receiving reports from the monitors and for storing report data in the database; the server having an logic inference engine for analyzing data stored in the database to isolate faults responsible for detected anomalies and a module for generating and transmitting control signals to one or more of the monitors to cause the one or more of the monitors to monitor predetermined parameters of the signal.

According to another aspect of the disclosed embodiments is a video decoding device operable on an MPEG transport stream transmitted through a digital broadcast network implementing the ISO open system interconnect network model, the video decoding device decoding said MPEG transport stream to output AV signals. The video decoding device includes a monitor operable on the MPEG transport stream for inferring Audio/Video (AV) quality of AV signals transmitted on the broadcast network by continuously performing one or more tests on the MPEG transport stream during normal operation of said broadcast network to detect anomalies which exceed predetermined parameters in AV signals transmitted in the MPEG transport stream on said broadcast network and received by the video decoding device, the monitor being operable to also detect problems with the video decoding device.

According to another aspect is a centralized monitoring system for automatically detecting and locating problems in an IPTV (Internet Protocol Television) network having a plurality of network components for transmitting Audio/Video (AV) services transmitted in an MPEG transport stream to a plurality of customer video decoding devices that are capable of decoding digital AV bitstreams. The centralized monitoring system includes: a data collection system for receiving and storing reports of detected anomalies from a plurality of customer video decoding devices that each perform one or more tests to detect anomalies in AV signals received thereby through the IPTV network during normal operation of IPTV network; and an inference engine for automatically analyzing a plurality of the reports to isolate faults responsible for detected anomalies and identify a probable source of the detected anomalies.

According to another aspect is a method for supporting and quality monitoring digital Audio/Video (AV) services transmitted in an MPEG transport stream in an AV broadcast network implementing the ISO open system interconnect network model and having video decoding devices capable of decoding digital AV bitstreams. The method includes: receiving at a management server reports of detected anomalies from a plurality of video decoding devices that each perform one or more tests to detect anomalies in AV signals received thereby through the broadcast network in an MPEG transport stream during normal operation of said digital broadcast network, aggregating the reports from the plurality of the video decoding devices in a database; and automatically analyzing the aggregated reports to isolate faults responsible for detected anomalies and identify a probable source of the detected anomalies.

BRIEF DESCRIPTION OF THE DRAWINGS

These and other features of the invention will become more apparent from the following description in which reference is made to the appended drawings in which.

DETAILED DESCRIPTION OF EMBODIMENTS OF THE INVENTION

Figure 1:
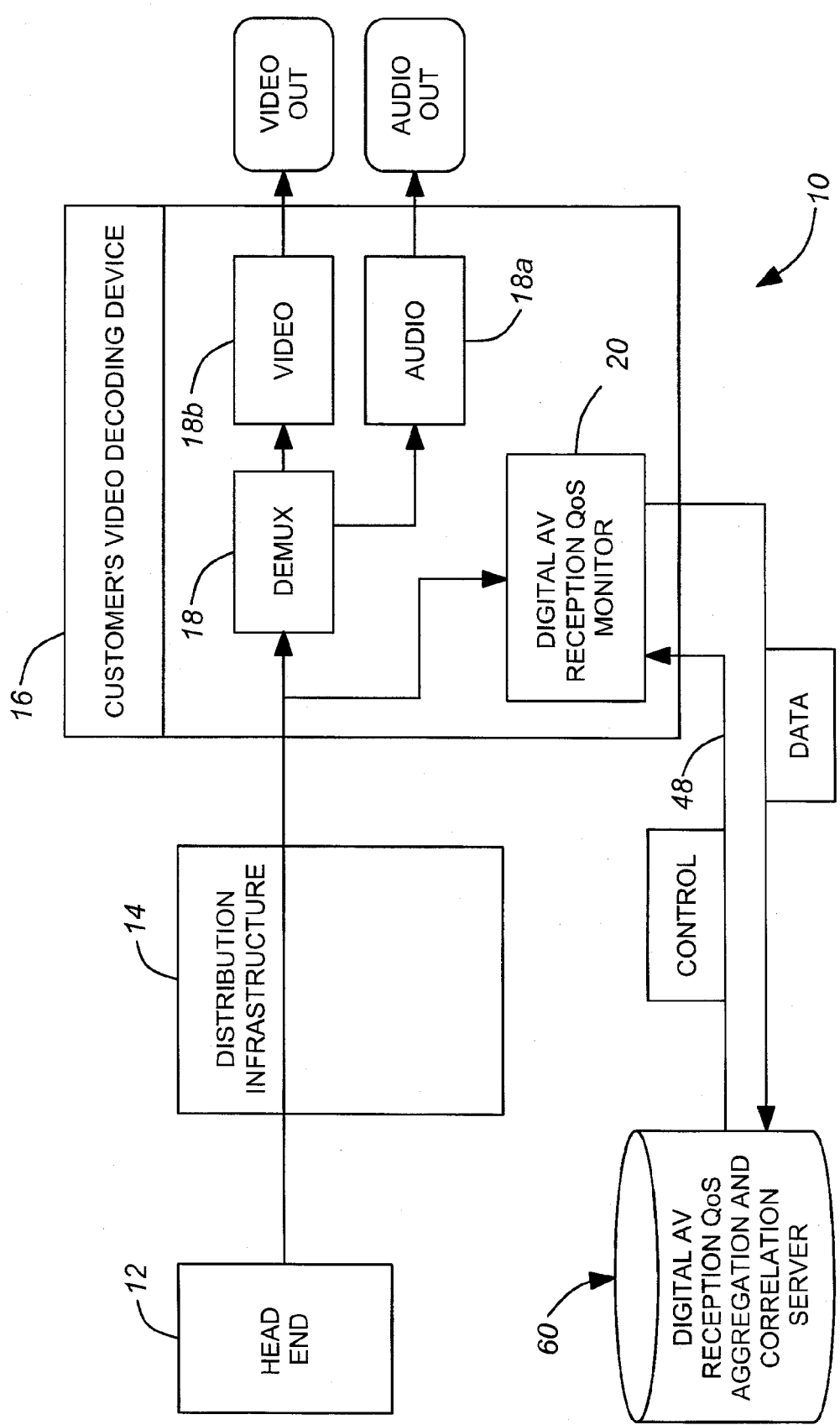
FIG. 1 is a block diagrammatic view of an AV network which includes an AV monitor incorporated into a set top box (STB)

The present invention relates to a system and method for supporting and quality monitoring digital AV services of any hardware and/or software device (e.g., set top box, cell phone, personal computer, personal digital assistant) capable of decoding a digital AV bitstream, generally referred to hereafter as video decoding devices (VDDs). This is accomplished in a non-intrusive manner without degradation in any aspect of performance of the VDDs. Currently, service providers have no visibility into the Quality of Service (QoS) with respect to the delivery of digital AV services to their customers. The present invention employs constant (always on) and real-time monitoring of digital AV data at each VDD in order to discern the Quality of Service (QoS) of digital AV reception.

One feature of the present invention relates to the provision of an AV signal monitoring agent (sometimes referred to as client herein) for each VDD which operates continuously performing one or more tests of each AV signal delivered to the VDD during normal operation of the broadcast network. The monitors detect transient anomalies in the AV signals which exceed predetermined parameter levels or ranges.

Another feature of the invention is a management or central server which collects reports output by the signal monitoring agents to provide scalable aggregation and correlation of digital AV QoS reception information. The server uses aggregated and correlated QoS information to provide diagnostic and fault location information to components and/or sections of a service provider's infrastructure. The server logs end-to-end performance trends and proactively gathers information which precedes failures and uses the information to determine the general location of failures and performance bottlenecks (troubleshooting and diagnosis). It will be seen later that aggregation of digital AV reception QoS data enables direct correlation and isolation of any given fault to the level desired (component or section depending upon availability of distribution infrastructure topographical information) and from the subscriber's home back through the distribution infrastructure to the Head-End.

Digital AV bitstreams are complex and many things can potentially go wrong. The major contributor to any digital AV bitstream is the encoder and, therefore, it is appropriate to monitor this device directly for bitstream protocol, health and AV compression performance. A wide range of devices already exist to conduct testing and monitoring of encoders. However, the present invention is also concerned with the performance of the distribution infrastructure and its suitability for the delivery of digital AV services. Therefore, it is appropriate to focus upon the type of damage that is reasonable to expect during transmission of the digital AV bitstream through the distribution infrastructure. For example, it is reasonable to expect loss and/or corruption of data. It is not reasonable to expect the distribution infrastructure to decrease the quality of compressed AV data by modifying data values while maintaining a valid bitstream structure.

FIG. 1 illustrates an IPTV digital network and a transient video anomaly analysis and reporting system (TVAAR) according to an embodiment 10 of present invention. The system seeks to capitalize on the fact that, in digital AV transmission, AV quality is guaranteed from a Head-End 12 through a distribution Infrastructure 14 to customer VDD 16 if no data packets are lost or corrupted. The invention provides a small set of International Standard Organization (ISO) Layer 4 (Transport Layer) tests, performed in AV signal monitors 20 located in VDDs 16 at the edges or periphery of the network, that infer AV quality at ISO Level 7 (Application Layer). An advantage of performing the tests in the Transport Layer is that it minimizes the size of a monitoring agent which performs the tests with respect to one which operates at the Application Layer. The system of the present invention also includes management server 60 which receives and processes test result reports output by signal monitors 20 when the results of one or more tests reveal signal anomalies which fall outside predetermined parameter levels.

The following tests are performed continuously by each monitoring agent on each VDD unit during the normal operation of the digital network with no degradation in any aspect of performance of the unit:

Sync Test—For broadcast applications, a subscriber can choose to join a digital AV service at any time. The first thing any decoder needs to do after joining any broadcast service is to establish sync. This is required in order to know how to distinguish between audio and video data, or bitstream structures such as headers, format fields/flags etc. This test requires monitoring the structure of the bitstream with respect to obtaining and maintaining sync. In MPEG-2 Transport Streams, the Sync Byte is monitored for consistent occurrence every 188 bytes. ASF (Microsoft WM9) bitstreams would require successful identification of Data Packets contained within a data object. If the Sync Test cannot be passed, the service is not decodable even though a bitstream may be arriving at the VDD. Corruption of data during transmission can lead to loss of sync.

Service Information Test—Before audio and video data contained within the bitstream can be decoded, decoder 18 in VDD 16 needs to be initialized to understand the properties of the audio and video data contained within the bitstream. Otherwise, the decoder may not be able to find the audio and video data or may not know what to do with it. This test involves checking the appropriate service information for validity. As examples only, in MPEG-2 Transport Streams, the Program Specific Information (PSI) can be checked for decodability. For ASF bitstreams, an ".nsc" file can be checked for decodability or the decoder's ability to find the ASF bitstream itself can be monitored. If the Service Information test cannot be passed, the service is not decodable even though a bitstream is arriving at the VDD. Corruption or loss of data can lead to loss of service information.

Continuity Test—After a decoder has successfully joined a digital AV bitstream, it needs to continually receive audio and video data and pass this information on to the appropriate audio decoder 18*a* or video decoder 18*b*. However, a decodable bitstream can still suffer from loss or corruption of data which will adversely impact the reception of this audio and/or video data. Thus, this test involves monitoring arriving data for loss of both audio and video data. As examples only, in MPEG-2 Transport Streams, the Transport Stream Header Continuity Count is monitored for both audio and video individually. For ASF bitstreams, data packets need to be monitored for continuity. Detection of loss of continuity enables identification of events which lead to temporary compromise of audio presentation, video presentation or both.

Loss of Service Test—After a decoder has successfully joined a digital AV bitstream, it needs to continually receive audio and video data and pass this information on to the appropriate audio or video decoder. However, a decodable bitstream transmission can suddenly be cut off by failure of a distribution infrastructure component. It is also feasible to loose either the audio or video elementary stream within the bitstream itself. As examples only, in MPEG-2 Transport Streams, the audio and video Packet Identifier (PID) is simply monitored every few seconds to ensure that data for each elementary stream (audio and video) is still arriving as expected. For ASF bitstreams, the arrival of data packets is monitored. Detection of loss of service enables identification of major events which lead to loss of service with respect to audio, video or both.

The foregoing tests allow for the construction of a very small (in both memory and CPU usage) digital AV reception signal monitor or client 20 on a VDD. The VDD can be a set top box, cell phone, personal computer, or personal digital assistant which decodes a picture for final viewing. The monitor is not dependent on "middleware" which controls the digital AV service or its client software on customer VDDs. The small size of the monitor allows it to run continuously on all VDDs providing real-time and continuous monitoring of AV quality with respect to the broadcast application. Independence from the middleware means that the monitor module can run ubiquitously on all customer VDDs in any network or groups of networks.

The signal monitor is capable of recognizing and tracing lost Video and Audio packets for troubleshooting and diagnosing the Service Provider's infrastructure. However, if it is desired to provide a closer correlation between video packet loss detected at the monitor and the resulting impact perceived by a subscriber, the monitor can be extended to perform further MPEG parsing in order to determine the relative significance of lost video packets.

As is known in the art, an MPEG-2 video elementary stream consists of three types of pictures. The three types of pictures enable increasing amounts of compression by becoming increasingly dependent upon each other in decoding individual pictures. This increasing dependence results in some video data being significantly more critical to video quality than others. The three types of pictures are: Intra-coded (I), Predictive-coded (P), and Bidirectionally-Predictive-coded (B).

An Intra-coded (I) picture offers the least amount of compression due to its absolute reliance only on spatial compression techniques. This restriction is necessary in order to have pictures which can be successfully decoded without needing information from other pictures. This type of picture usually occurs once or twice a second and possibly at scene changes. It is critical for the encoder to accomplish as high a picture quality as possible with intra-coded pictures since many following B and P pictures will be dependent upon this picture (directly or indirectly). Since many B and P pictures depend upon each I picture (typically 14 to 29 pictures), video data identified as Intra-coded picture data is the most critical to picture quality.

A predictive-coded (P) picture accomplishes superior compression compared to an I picture by referencing picture elements from an immediately preceding I or P picture. This is known as temporal compression. P picture quality is still relatively important as many B and P pictures will be dependent upon this picture (typically 2 to 26 pictures depend upon an individual P picture position in a Group Of Pictures or GOP). Note that each successive P picture is less important than the preceding one until after the next I picture, as less and less pictures will reference it (for example, the last P picture in a GOP will only be referenced by 2 or 4 B pictures). Since less B and P pictures are dependent upon P pictures, video data identified as predictive-coded (P) picture data is second in importance compared to Intra-coded (I) picture data.

Bidirectionally-predictive-coded (B) data offers the greatest amount of compression due to its ability to reference preceding and "future" P and I pictures for picture elements. However since no picture can reference a B picture, video data identified as bidirectionally-predictive-coded (B) is the least important video data.

Therefore by keeping track of the picture type represented in the current video data, detection of lost data can be matched with three levels of importance with respect to picture quality. Further by keeping track of the picture count and time code, it is possible to measure data loss events that involve one or more skipped pictures.

The following description discusses the basic method that will enable parsing and tracking of video data picture type for any legal MPEG-2 video elementary stream. This is followed by a description of a preferred method which provides superior parsing efficiency which should work for all known IPTV.

Picture type can be tracked in any MPEG-2 video elementary stream simply by parsing and examining the Picture header. For NTSC, this data structure will occur roughly 30 times each second (25 times per second of PAL). The first three fields of the Picture header are as follows:

| Picture_header ( ) | |
|---|---|
| { Picture_start_code | ;32 bit field |
| Temporal_reference | ;10 bit field |
| Picture_coding_type | ;3 bit field. |

The picture_header can be simply found by parsing the Transport Stream looking for the picture_start_code which is a 32 bit field having the value 00000100 in hexadecimal.

The temporal_reference is a 10 bit unsigned integer associated with the display order of each coded picture. Therefore, the value given to each successive picture in the video elementary stream is dependent upon GOP structure and can seem confusing at first. For example, the most common GOP structure in display order is as follows BBIBBPBBPBBPBBP (and numbered as 0,1,2,3,4,5,6,7,8,9, 10,11,12,13,14). However, in the elementary stream the frames will be in a different order IBBPBBPBBPBBPBB (and numbered as 2,0,1,5,3,4,8,6,7,11,9,10,14,12,13). Note that "future" I and P pictures are coded before their related B pictures. If this value is tracked, then data loss events greater than one picture but less than a GOP in size can be tracked.

The picture_coding_type identifies whether a picture is I, P or B as shown in the table below.

| picture_coding_type | coding method |
| --- | --- |
| 000 | Forbidden |
| 001 | intra-coded (I) |
| 010 | predictive-coded (P) |
| 011 | bidirectional-predictive-coded (B) |
| 100 | shall not be used (dc intra-coded (D) in ISO/IEC11172-2) |
| 101 | Reserved |
| 110 | Reserved |
| 111 | Reserved |

Once the current picture_coding_type is known, any video data loss detected can be assumed to be of the current picture type unless the temporal reference or time_code (described below) reveal that a data loss greater than a single picture has occurred. Data loss with the current picture type of Intra (I) is more critical then a picture type of Predictive (P) which is in turn more critical than a picture type of Bidirectionally-Predictive (B).

The Group Of Pictures (GOP) header will occur in the video elementary stream roughly 1 or 2 times per second. Parsing for this data structure enables retrieval of the time_code which enables tracking video data loss events greater than the size of the Group-Of-Pictures (GOP).

The first seven fields of the GOP header are as follows:

| Group_of_pictures_header( ) { | |
| --- | --- |
| Group_start_code | ;32 bit field |
| Drop_frame_flag | ;1 bit field |
| Time_code_hours (0-23) | ;5 bit field |
| Time_code_minutes (0-59) | ;6 bit field |
| Marker_bit (1) | ;1 bit field |
| Time_code_seconds (0-59) | ;6 bit field |
| Time_code_pictures (0-59) | ;6 bit field |

The group_of_pictures_header can be found simply by parsing the Transport Stream for the group_start_code which is a 32 bit field having the value 000001B8 in hexadecimal.

The significant fields in the GOP_header are the time_code fields providing hours: minutes:seconds.pictures. Ignore the drop_frame_flag. The marker_bit is fixed with a value of 1. Its only purpose is to insure that GOP_header does not emulate a start_code.

Increasing Parsing Efficiency

Although it is possible to simply parse the MPEG stream for the picture_start_code (0x00000100) and the group_start_code (0x000001B8), an embodiment of the invention provides a more efficient method which will work for most relevant transport streams. The TVAAR monitor parses the Transport Stream header shown in Diagram 1. The third field of this structure is the payload_unit_start_indicator, which is a 1 bit flag. When this flag is set to one for video packets (identified by the 13-bit Packet Identifier (PID) value), the packet contains the start of a new picture and, therefore, a new picture header. Using this method, only 30 video packets per second need further parsing to find the picture_header and retrieve the picture type and picture number. Note that the group_of_pictures_header should be found in only 1 or 2 of the above mentioned 30 video packets.

| Diagram 1: Transport Stream header | | | | | | | |
| --- | --- | --- | --- | --- | --- | --- | --- |
| 8 | 1 | 1 | 1 | 13 | 2 | 2 | 4 (bits) |
| Sync Byte | Transport error ind. | Payload unit start ind. | Transport priority | PID | Transport scrambling control | Adaptation field control | Continuity Counter |

It will be seen therefore that by keeping track of picture coding type (I, P, or B), the relative importance of lost video data can be determined; by keeping track of picture number (temporal_reference), video data loss involving multiple pictures within the size of the GOP (group of pictures) can be tracked; and by keeping track of group_of_pictures time_code, video data loss involving multiple pictures greater than the size of the GOP can be tracked.

Figure 2A:
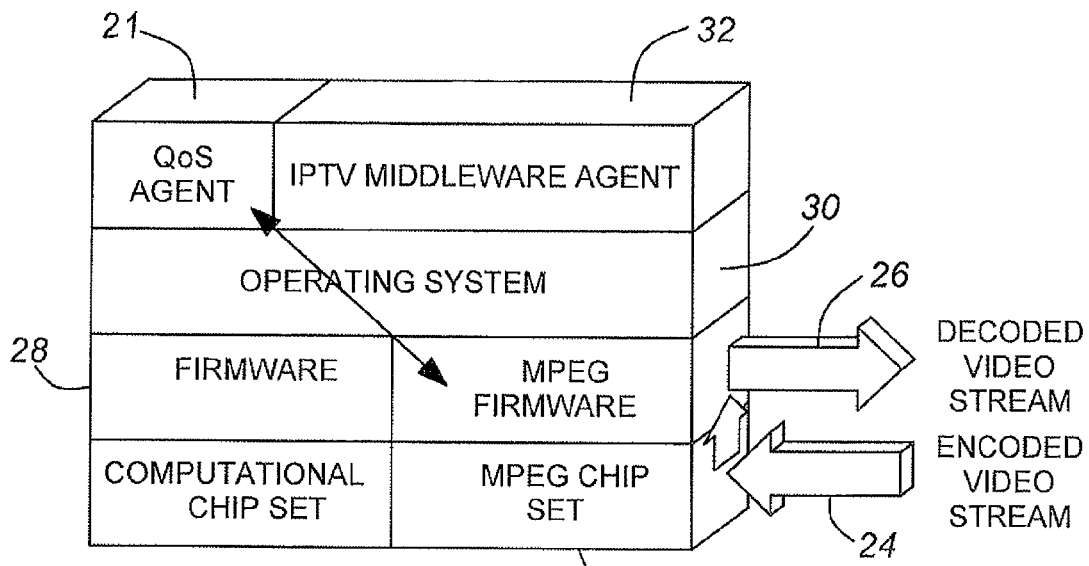
FIGS. 2(a) and 2(b) illustrate IPTV architectures in which a monitor, in accordance with an embodiment of the present invention, is embodied.

FIG. 2(a) illustrates an IPTV STB standard architecture which includes a chip set 22 which receives an encoded video stream 24, MPEG firmware 31 which outputs decoded video stream 26, and firmware 28. Operating system 30 resides above the firmware layer. The IPTV Middleware agent 32 and the QoS Agent 21 of the present invention reside above the operating system layer.

Figure 2B:
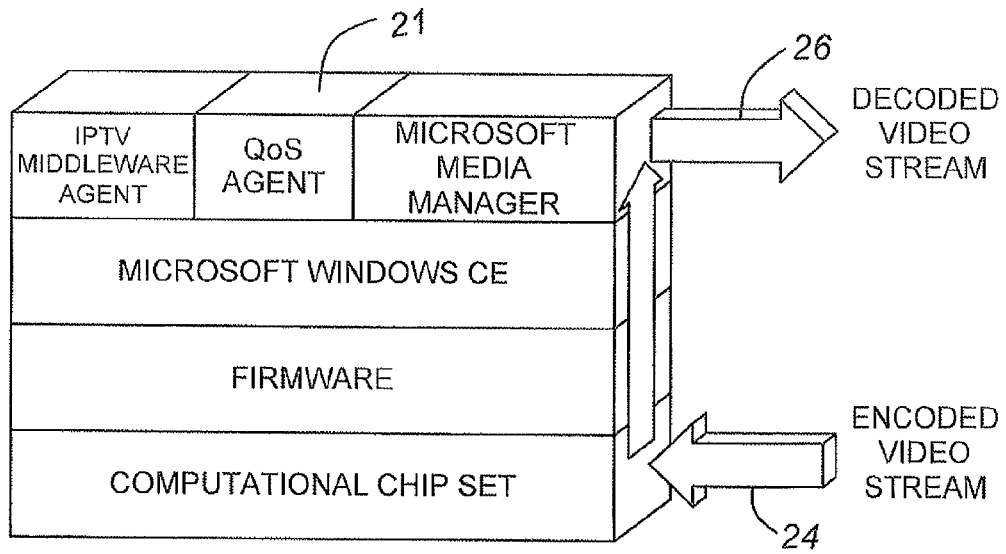

FIG. 2(b) illustrates an IPTV STB Microsoft Architecture showing the QoS Agent 21 residing in the same layer as the IPTV Middleware Agent and Microsoft Media Manager. As can be seen, an encoded video stream 24 enters the computational chip set and a decoded video stream exits the media manager. In this embodiment, the QoS Agent becomes an additional filter in the video decoding graph of the Microsoft Media Manager, thus illustrating how the Agent is able to access the data flow in a Microsoft Architecture.

The monitoring agent monitors the AV and middleware interaction as presented to the STB, thus capturing all impairments which accumulate across the entire network from Head-End through the last mile and home network and into the STB. It monitors A/V performance in real time. Middleware interactions and key STB resources can also be monitored.

As mentioned above, signal monitors 20 run continuously, so they can trap transient events and service degradations, which are otherwise very difficult or impossible to detect and isolate. The ability to capture transient events below the threshold at which consumers perceive the degradation enable service providers to gain critical visibility into their network performance and to predict more serious degradations. Service providers will thus be able to invoke preventive measures before consumers experience and report problems to help desk personnel, avoiding the associated costs of reacting to those complaints, and ensuring higher levels of customer satisfaction with the equipment and service.

Figure 3:
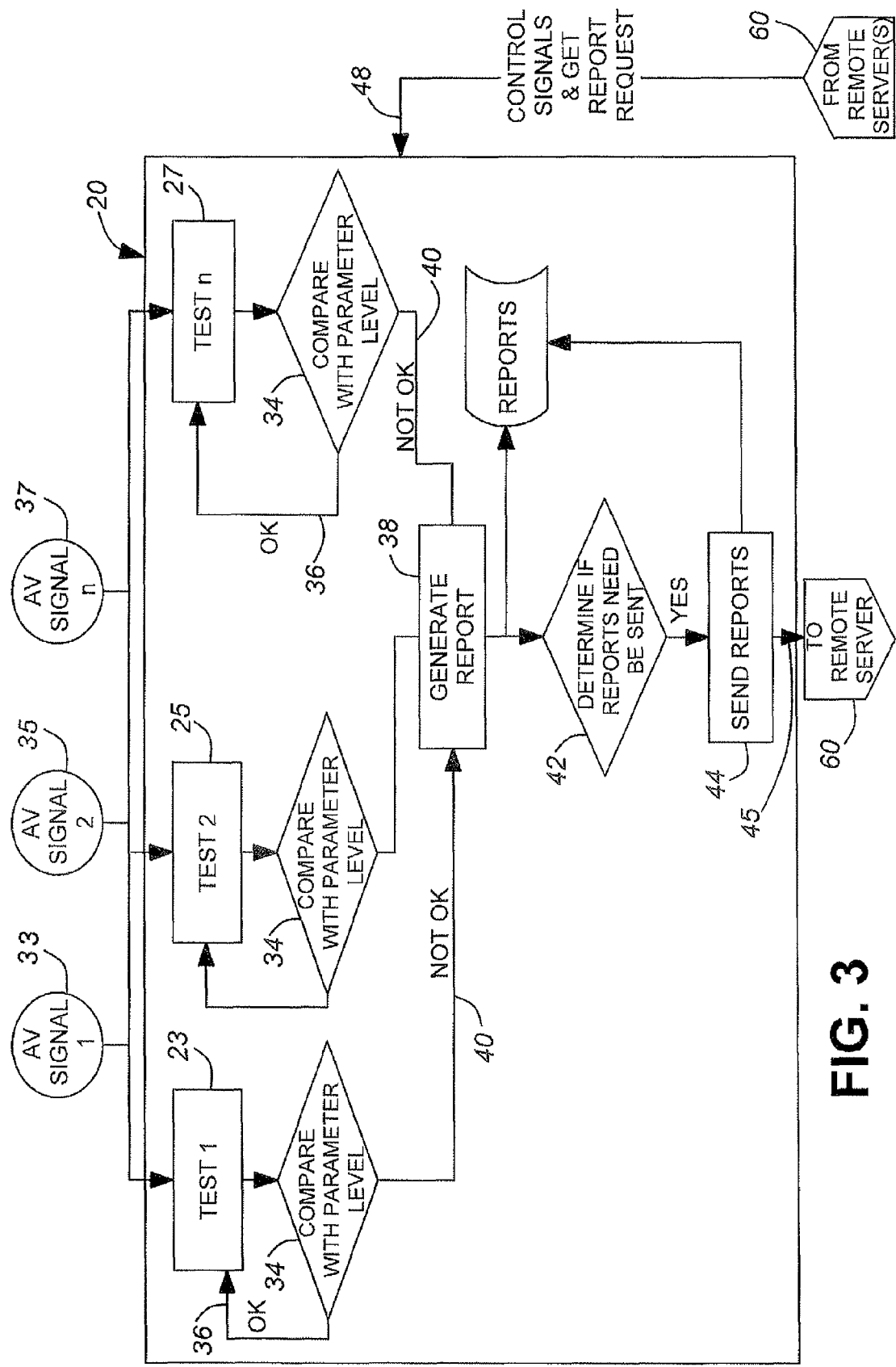
FIG. 3 is a block diagrammatic view of a management server according to an embodiment of the present invention.

The algorithms employed by the signal monitors can be applicable to both standard and high definition TV services, and compatible with multiple encoding and compression formats ranging from MPEG-2 to H.264 to Microsoft VC-1., and other distribution methods as well (i.e. IP multicast, digital terrestrial, satellite, digital cable, etc). Examples of the types of problems the QoS Agent may in various configurations detect are listed below, but are not limited to:

- Loss of an individual audio/video channel
- Complete loss of STB Video input
- Intermittent loss of STB video input
- Intermittent loss of STB audio input
- Complete loss of STB audio input
- Declining DSL train rate
- Home network congestion or high error rates
- Repeated STB re-boot
- Slow re-boot
- Loss of EPG and/or program info
- Loss of connectivity to STB
- Detect Home network connectivity problem FIG. 3 diagrammatically illustrates signal monitor 20 according to an embodiment of the present invention. The AV signal monitor is provided with modules 23, 25, 27, corresponding to test 1, test 2, and test n, respectively. In a preferred embodiment, the monitor is provided with four modules, each performing one of the four aforementioned tests (synchronization test; a service information test; a continuity test; and a loss of service test) discussed earlier. Each monitor receives AV signals 33, 35, 37 delivered to associated VDD 16 and directs the signals to each test module for testing. Each module performs a test and compares, at 34, its respective test result against a predetermined parameter level or range. Each module continuously repeats its respective test as indicated by lines 36. When a test result falls outside the predetermined parameter level or range, report generation module 38 is activated via lines 40. The report generator determines, at 42, whether a report needs to be sent and, if so, a report is generated and transmitted by report transmitter 44 to maintenance server 60, via line 45.

Each monitor is responsive to control signals 48 output by the maintenance server. The control signals instruct the monitor to perform one or more specific tests and specify parameter levels or ranges, or cause one or more monitors to transmit a report of current test results.

Figure 4:
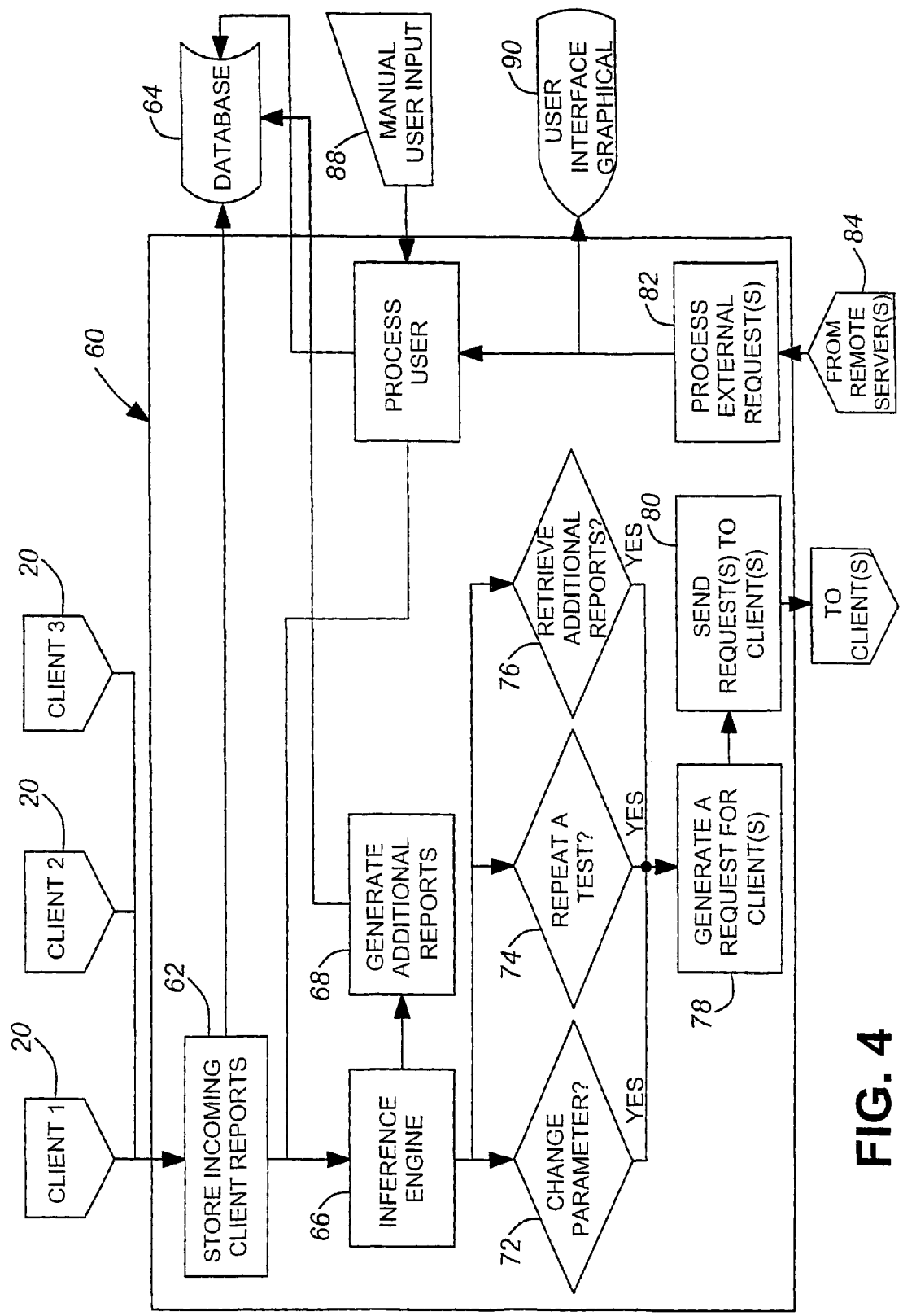
FIG. 4 is a block diagrammatic view of a management server according to an embodiment of the present invention.

FIG. 4 illustrates an embodiment of management server 60 which provides scalable control of AV signal monitors 20 and scalable data acquisition of monitor QoS data which is stored in a central database 64 via module 62. This enables the determination and display of Key Performance Indicators (KPI) with respect to the broadcast application. While service providers have tools which monitor components within their distribution infrastructure, these tools are usually not aware of the individual customer AV services. Instead, they are focused on underlying transmission technology.

As previously mentioned, the management server provides scalable aggregation and correlation of digital AV QoS reception information. The server uses aggregated and correlated QoS information to provide diagnostic and fault location information to components and/or sections of a service provider's infrastructure. The server logs end-to-end performance trends and proactively gathers information which precedes failures and uses the information to determine the general location of failures and performance bottlenecks (troubleshooting and diagnosis). As is explained later in greater detail, the aggregation of digital AV monitor QoS data enables direct correlation and isolation of any given fault to the level desired (component or section depending upon availability of distribution infrastructure topographical information) and from the subscriber's home back through the distribution infrastructure to the Head-End.

Thus, server 60 includes an inference engine 66 which analyses the reports received from monitors 20. Analysis results are delivered to a report generator 68. Generated reports are stored database 64. The server determines, at 72, whether test parameters should be changed; whether one or more tests should be repeated (at 74); and whether additional reports should be retrieved from the monitors (at 76). If a test is to be repeated, a test request generation module 78 generates the request, applies the request to request transmitter 80 which, in turn, transmits the request to the appropriate monitors/clients. The server further includes a module 82 for processing requests from remote servers 84, a user input processor 86 for processing user input via a manual input device 88. The server outputs data to a graphical user interface 90.

Management server 60 initiates active tests as required, described above, via a control line 48 to conduct automated troubleshooting and diagnosis of significant QoS errors. These tests may involve using inactive and/or dedicated VDDs as automated diagnostic equipment (or server configurable test points) in order to intelligently collect pertinent information with respect to any current QoS issue.

It will be seen that the provision of real-time and continuous monitoring of broadcast services on all VDDs, allows a service provider to be informed as soon as any subscriber experiences digital AV reception issues. The service provider is also informed regarding the severity of an AV reception issue, regardless of whether they are noticeable to the subscriber or significant enough to cause the subscriber to phone the "Help Desk". This enables the service provider to address service issues pro-actively.

Heretofore, when an issue is recognized, current approaches to troubleshooting focus on tests and measurements targeted to the subscriber's home (VDD and related equipment). These approaches overlook the pertinent data to be gained from knowledge of other subscriber VDDs and especially VDDs in the same neighborhood (sharing the same network topology) and/or consuming the same broadcast services.

By having real-time and continuous monitoring of broadcast services on all VDDs, the experience of other subscriber VDDs are leveraged during the troubleshooting and diagnostic process. For example, if other subscriber VDDs consuming the same digital AV service in the same neighborhood (or sharing network topography) are not reporting reception issues, then the issue is likely in the home. If all subscriber VDDs consuming the same digital AV service are reporting reception issues regardless of location (or neighborhood), then the issue is likely located in the head-end (or associated network access components). If reception issues are correlated to a neighborhood or network topography (VDDs in other locations are not experiencing reception issues with same digital AV service), then the issue is not in the home or the head-end but with shared distribution components.

The inference engine analyzes QoS information retrieved from all subscriber VDDs 16 in order to provide initial support of the Service Provider's broadband application by determining the severity of any reported QoS errors, logging QoS reports in order to determine trends for the proactive management of the service provider's infrastructure with respect to the broadband application, automatic initial diagnosis of any QoS errors defined as significant, escalation of significant errors by providing appropriate information to the proper segment/department of the service provider's infrastructure such as Head-End, Distribution Infrastructure or Core Network, Access Network or Home Network (CPE).

The foregoing illustrates the reactive end-to-end service assurance work process that is followed where the system is an integrated tool employed as part of a total solution. The monitor runs continuously in the background on all set top boxes on a service provider's network to monitor IPTV service quality. No action is taken by a monitor when the IPTV service operates within normal parameters.

If the IPTV service begins operating outside normal parameters (anomalies are detected by one or more monitors), then a monitor invokes processes to isolate faults. Any time that reportable events occur, a monitor sends a message to the management server to perform a log Information process. This message can be received by system logs on the server or can be received by a third party system via an open interface. Once the anomaly log information is received by the management server, the server may further attempt to isolate faults. Any determined information will be logged using the log Information process. At any time, a person (service assurance agent) who is responsible for managing the quality of the service on the IPTV service may use a web portal to query log information that has been sent from the monitor. The service assurance agent, the management server, or a third party system can adjust monitoring parameters. The monitor will receive and act on those instructions.

As previously indicated, the management server incorporates an inference logic engine 66 for IPTV problem detection and location identification. The inference logic engine is powered by a monitor/server IT computing architecture, where each and every STB in the service provider's network behaves as a diagnostic element under the control of a common server. While the system is operating, it unobtrusively and continuously monitors the IPTV network while its unique inference logic determines a) if IPTV problems exist; b) which network element(s) are causing the problems; and c) the location of the network element(s) causing problems.

The following are some of the key functional components of the inference logic:

Every monitor is a "diagnostic" element within the broadcast network. The system is designed such that the more STBs deployed in the providers network, the more accurate the results become. Each monitor is tasked to perform various tests to determine if the problems are present or not. All tests are grouped into the test functional units (i.e. AV health tests, core network tests, environmental tests, etc.) and are prioritized based on their effectiveness and performance impacts. The monitors are managed independently and can run different tests simultaneously.

All monitors are under the central control of the common server (or a cluster of servers). The server determines its information requirements and conditionally requests an interest level escalation within the monitor(s) to change what the monitor should monitor. When an interest level change occurs in a monitor, the diagnostic logic and data capturing behavior of an STB is changed.

The server logic dynamically changes its interest level in an STB. Some parts of the network (or customers) may be less error/fault prone; therefore the server "learns" and adjusts its interest in particular nodes as the need arises.

The server incorporates sectionalization logic to correlate errors reported across the network by monitors. Essentially, the server analyses what is currently happening on the network, determines the source, source location and provides a recommendation/solution to the problem.

The server performs targeted history logging to understand what has happened to the network and automatically modifies its history retention capabilities in areas of Interest, as required.

The server inference logic is "self learning" for automatic adoption of the IPTV network and for automatic subscriber service mapping. Upon initial activation of the system on the network, the system receives information from the first monitor; it populates an active inventory database and links to customer information and network information tables. As new nodes are turned up, the database is populated with information about the network. Data is flushed when no longer needed or valuable.

By receiving the activation information from monitors, the system dynamically adjusts a network map, which enables it to always have a correct view of the network. Furthermore, this correct view of the network allows the system to accurately assess problem spots in the network by using various correlation techniques, and without any need to interface with any network nodes. This makes the system completely network agnostic—it can operate in any network setup/environment. The system will operate in all digital TV network environments which incorporate boxes at the subscriber, e.g., digital cable or digital subscriber link (xDSL) TV.

FIGS. 5-12 each illustrate a simplified schematic of an IPTV broadcast model. Each figure illustrates a head-end of comprised of five encoders 120-128 providing compression of five channels CH1 through CH5. The services of these encoders enter the service provider's network 130 via two IP Gateways 132 and 134 and are aggregated at one ATM Switch or Router 136. These services are then distributed, either directly or via a second router 138, to all the DSLAMs 140-144, where they are forwarded to requesting customer Set Top Boxes (STBs) 150-166 (see FIGS. 6-12).

The following examples are only intended to illustrate how correlation of STB feedback/statistics can lead to system wide analysis and diagnostics. This assumes that STB feedback consists of only of current service failure and identification of that service (channel# /IP source). For each figure, the STBs are labeled with the service they are currently receiving.

Diagnostic STB

Figure 5:
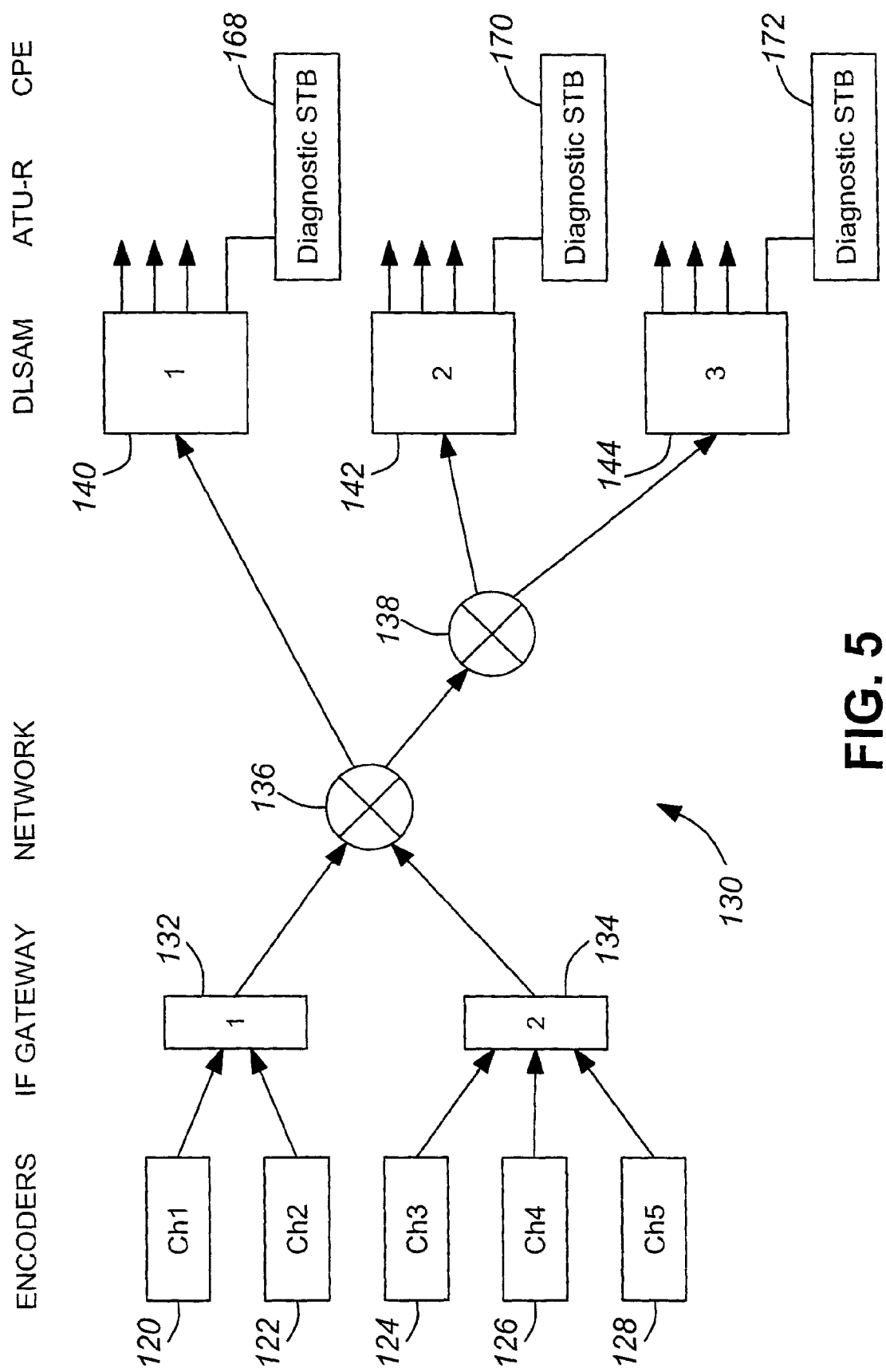
FIG. 5 illustrates an embodiment which includes a diagnostic STB.

FIG. 5 illustrates dedicated STBs 168, 170, 172 for DSLAM 140, 142, 144, respectively, located in the Central Office (CO). These STBs are situated in the same physical location as the DSLAMs. This turns one subscriber line per DSLAM into a test point and allow for further visibility into the QoS of any service at the edge of the network. The advantages of using STBs as diagnostic tools include reduced cost, identical performance to subscriber STBs, and easier manageability using existing middleware tools.

The TVAAR approach depends upon correlating information from multiple STBs to determine the source of errors. If, for example, an STB reports AV issues with an unpopular channel/service, there likely will not be another subscriber on the same DSLAM watching the same service. TVAAR can resolve this problem by ordering the diagnostic STB associated with the DSLAM to join the channel in question. If the diagnostic STB does not report any issues, the issue is isolated to the subscriber CPE or ADSL line). If the diagnostic STB reports issues, the issue is upstream in the network 136 or the Head-End. At this point, the TVAAR can order another diagnostic STB to join the same service on another DSLAM. If the second diagnostic STB does not report issues, the error is isolated to the first DSLAM. If the second diagnostic STB does reports issues, the error is again upstream in the network 136 or Head-End and not associated with the first DSLAM. This approach can be repeated until the failure is traced to a component in the network 136 or Head-End.

First Level Diagnostics

Figure 6:
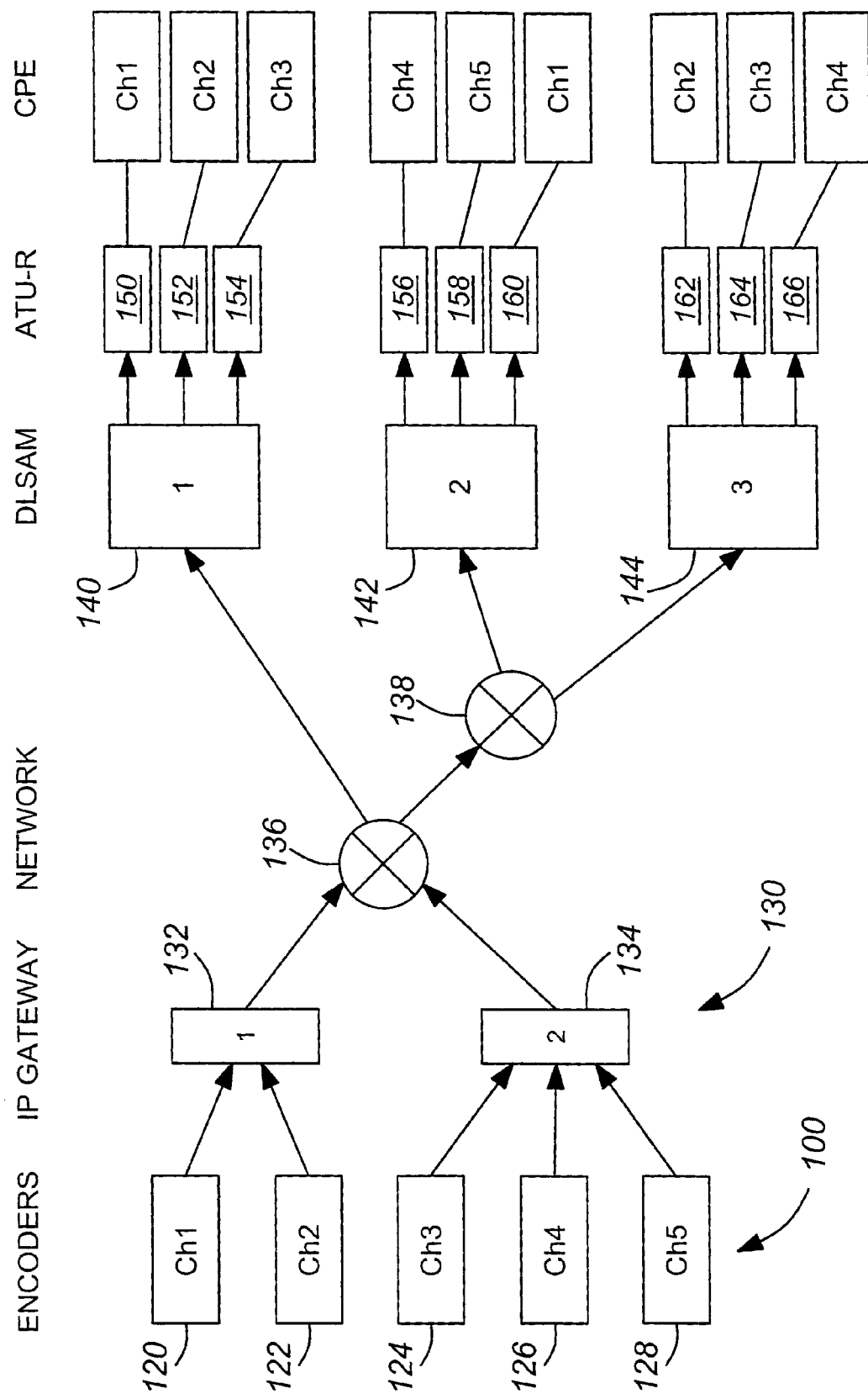
FIGS. 6-12 illustrate various defect scenarios and the manner in which these can be detected according to an embodiment of the present invention.

FIG. 6 represents a scenario with a failure of encoder 124. The TVAAR server will get feedback from the monitors in third STB 154 on DSLAM 140 and the second STB 164 on DSLAM 144. After the TVAAR server, using an inference engine, correlates this information, it will determine that all customers consuming the Ch3 service are experiencing failures while all other STBs sharing the same DSLAMs and network components are not. This will lead to the conclusion that the failure is originates in Head-End 100 and is likely encoder 124.

Figure 7:
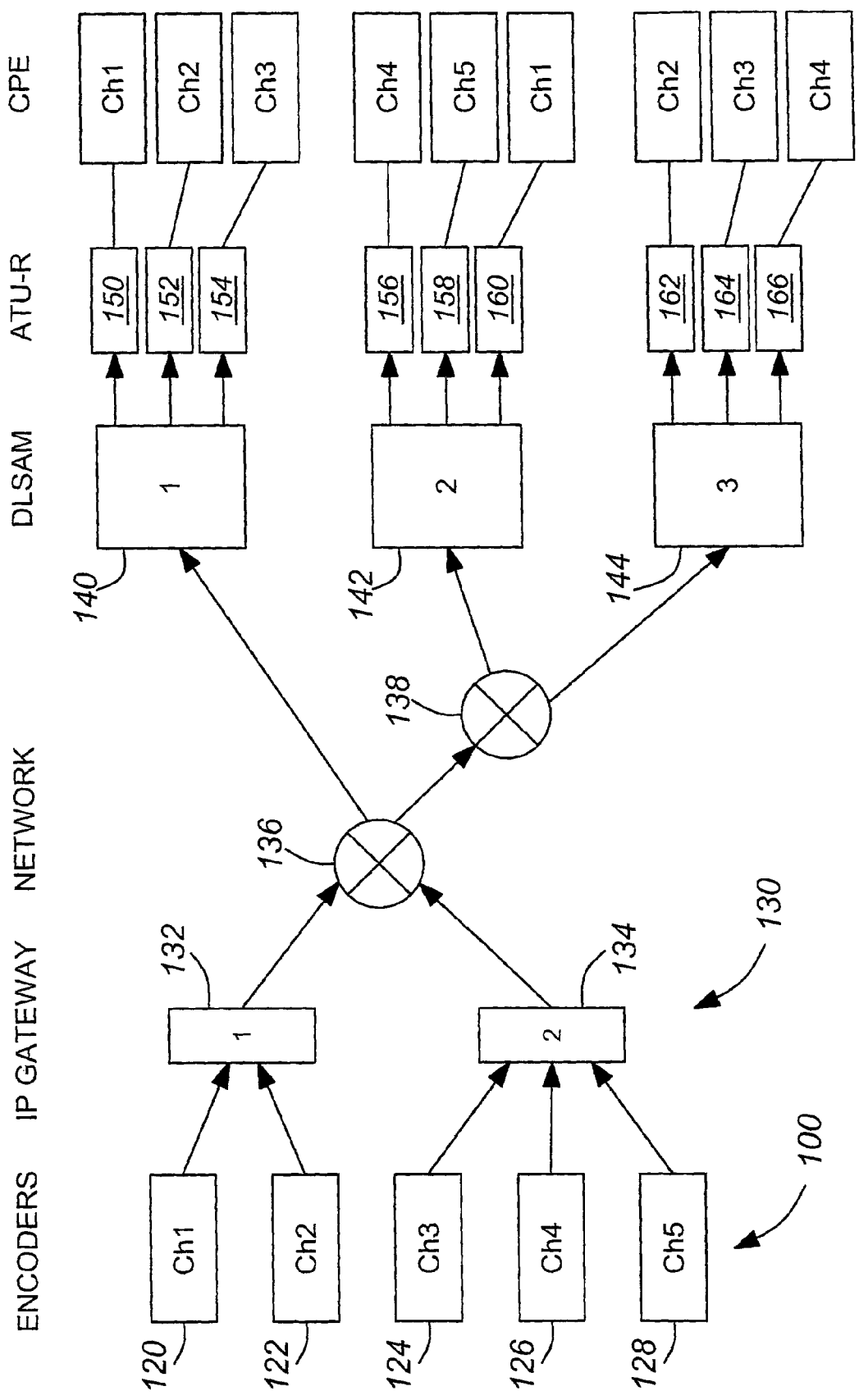

FIG. 7 represents a scenario with a failure with IP Gateway 132. The TVAAR server will get feedback from the monitors in first STB 150 and second STB 152 on DSLAM 140, the third STB 160 on DSLAM 142 and first STB 162 on DSLAM 144. After the TVAAR server correlates the results using the inference engine, it will determine that all customers consuming the Ch1 and Ch2 services are experiencing failures while all other STBs sharing the same DSLAMs and network components are not. This will lead to the conclusion that the failure originates in the Head-End 100. Further, as all services originating from IP Gateway 132 are failing, this component is suspect or the associated link with the aggregation network.

Figure 8:
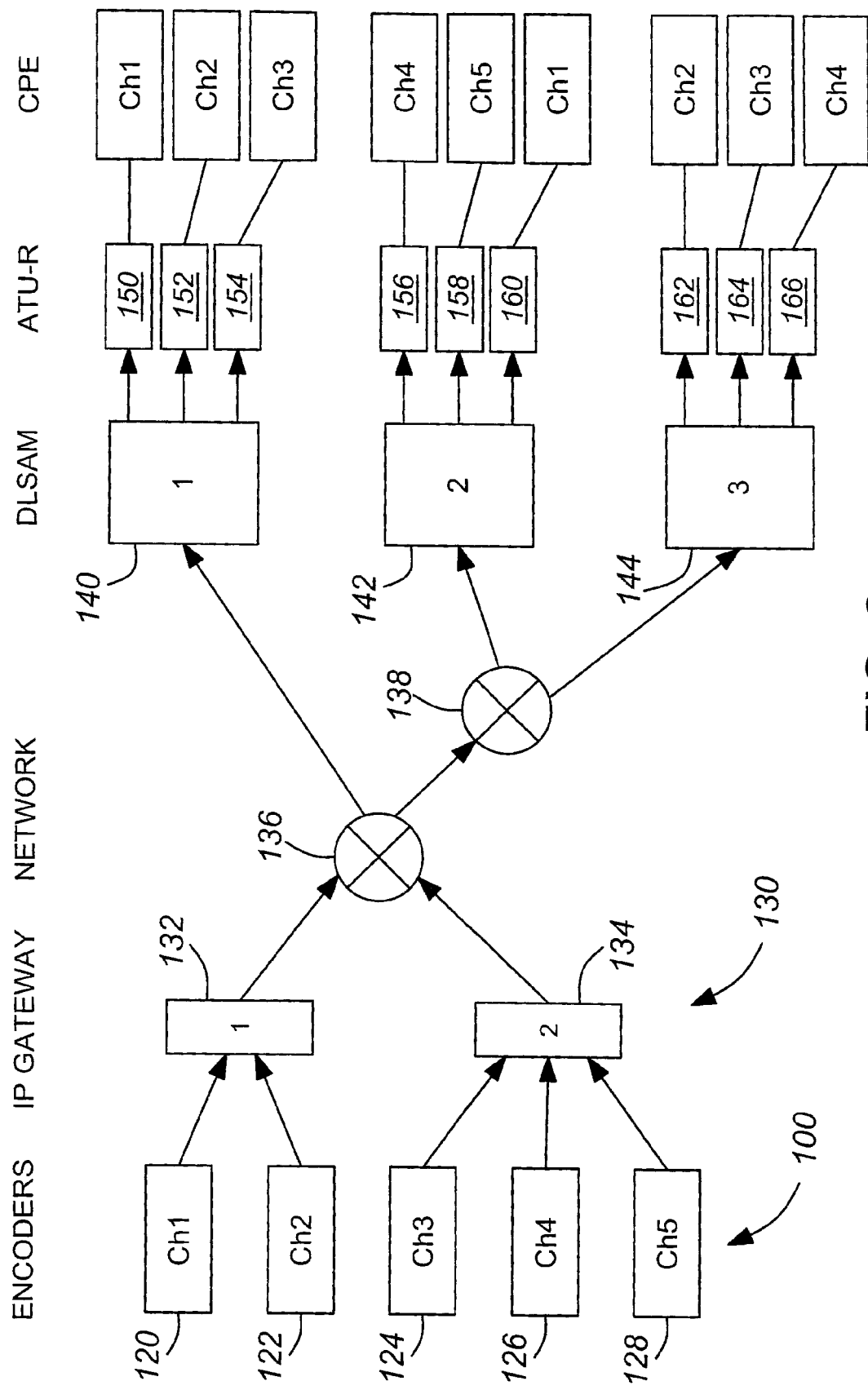

FIG. 8 represents a scenario with a failure with first router 136, effectively the aggregation network. The TVAAR server will get feedback from all monitors in STBs 150-166. After the TVAAR server correlates this information using the inference engine, it will determine that all customers consuming any service are experiencing failure. This will lead to the conclusion that the failure originates in the aggregation network. While this scenario is possible, it is also possible that an aggregation network component can partially fail and impact only a fraction of the services randomly impact different services at different times. Still the resulting TVAAR feedback should lead to the same conclusions.

Figure 9:
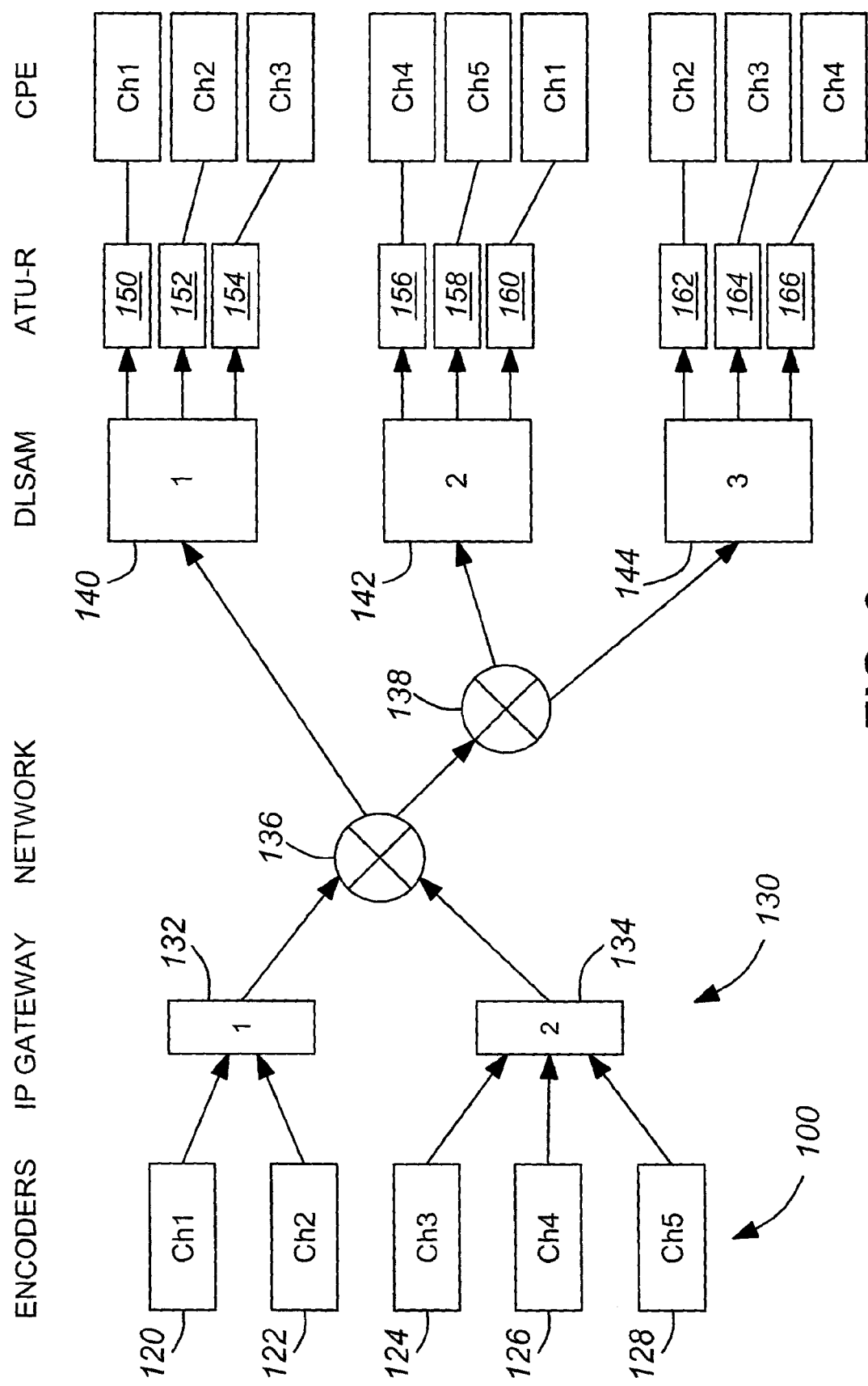

FIG. 9 represents a scenario with a failure with the second router 138. The TVAAR server will get feedback from the monitors in STBs 156-166 serviced by DSLAM 142 and DSLAM 144. After the TVAAR server correlates this information using the inference engine, it will determine that all customers consuming any service originating from router 138 is experiencing failure. This will lead to the conclusion that the failure originates in the network 130. While this scenario is possible, it is also possible that a network component can partially fail and impact only a fraction of the services or randomly impact different services at different times. Still the resulting TVAAR feedback should lead to the same conclusions.

Figure 10:
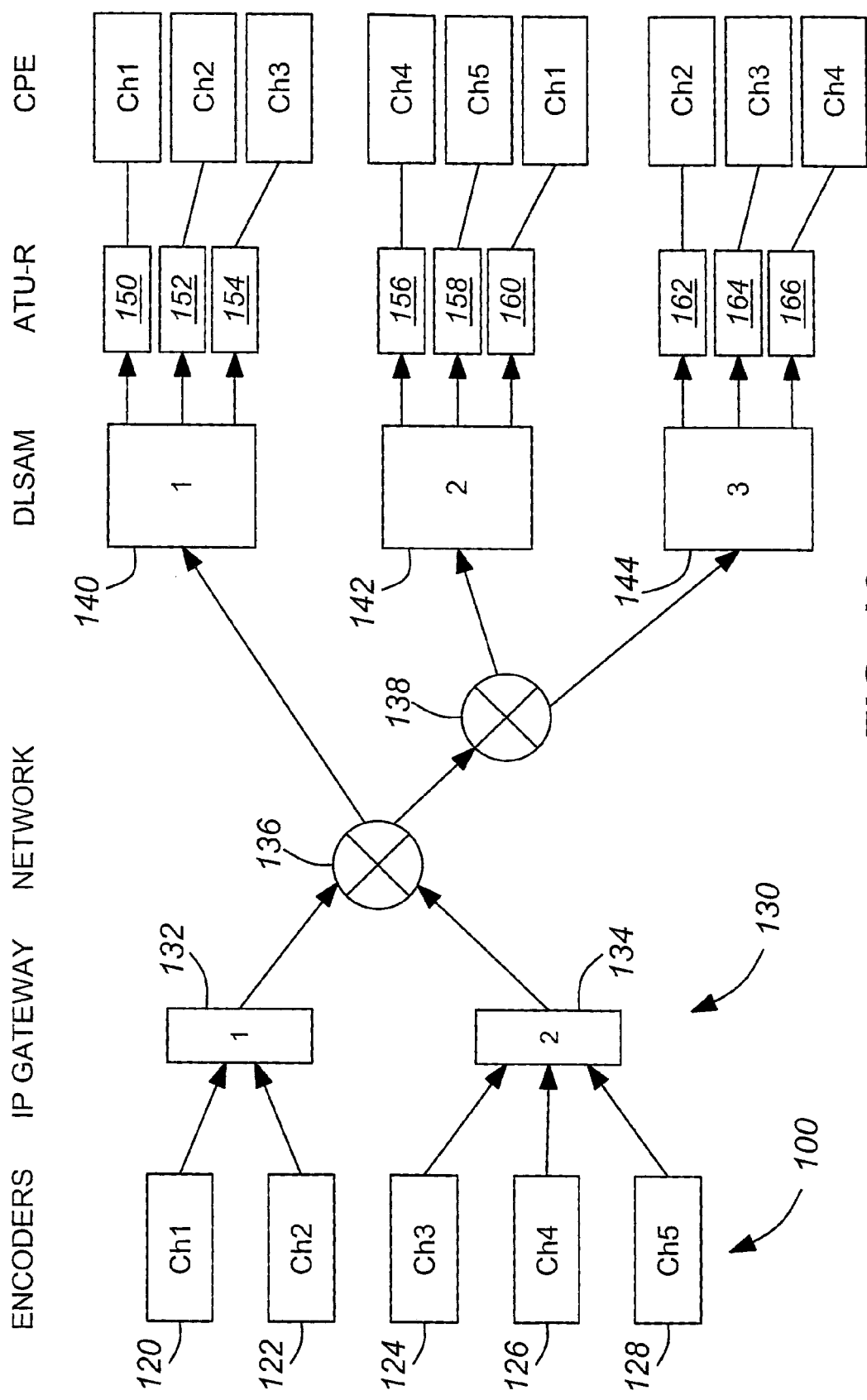

FIG. 10 illustrates a scenario with a failure with second DSLAM 142. The TVAAR server will get feedback from STBs 156-160 serviced by DSLAM 142. After the TVAAR server correlates this information, it will determine that all customers consuming any service originating from DLSAM 142 are experiencing failure. This will lead to the conclusion that the failure originates in the access network and, specifically, DSLAM 142. It will be noted that other STBs 150-154, 162-166 consuming the same services on DSLAMs 140, 144 would not be experiencing a failure. While this scenario is possible, it is also possible that a network component can partially fail and impact only a fraction of the services or randomly impact different services at different times. Still the resulting TVAAR feedback should lead to the same conclusions.

Figure 11:
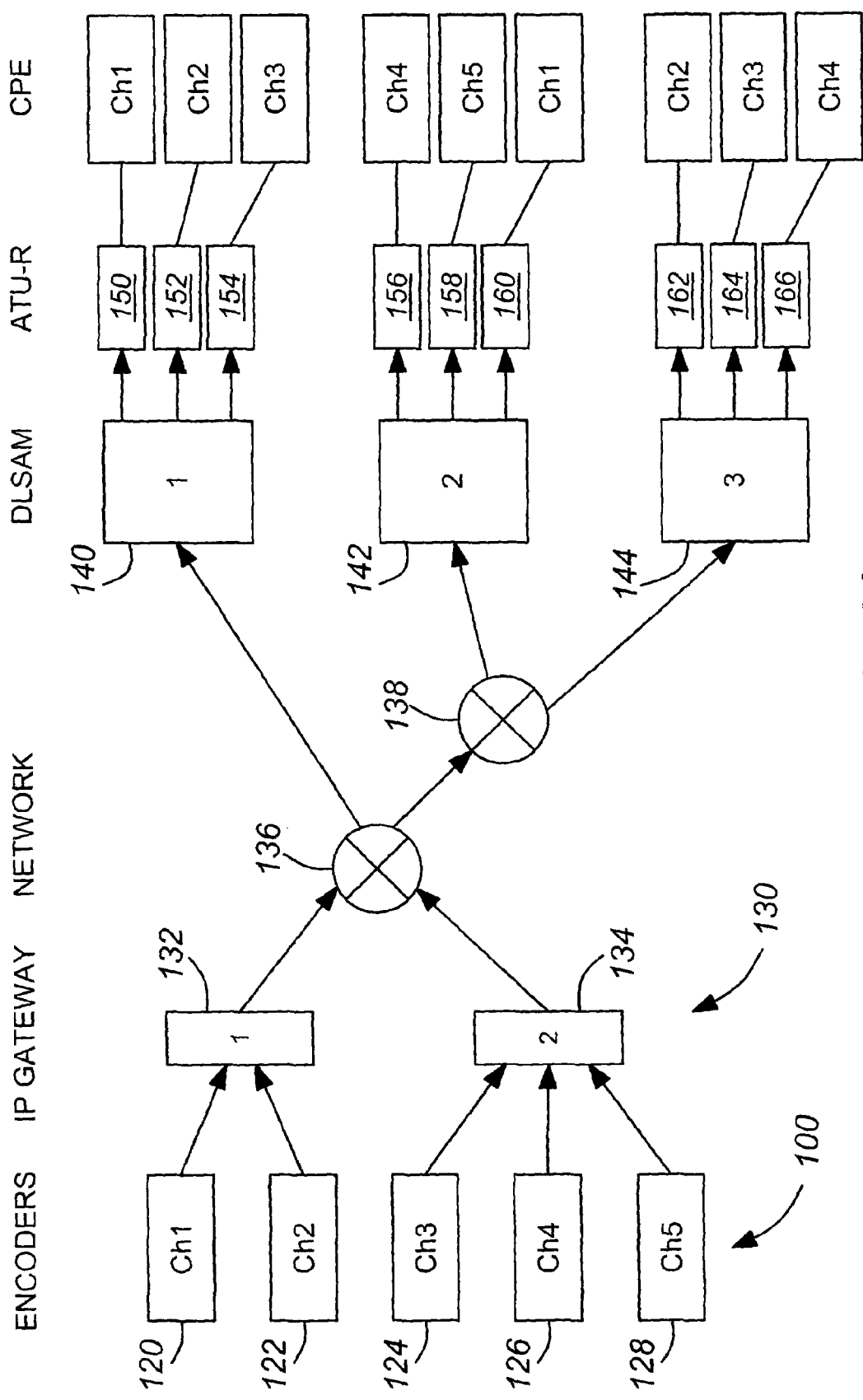

FIG. 11 represents a scenario with a failure in third STB 160 on DSLAM 142 which is consuming Ch1. The TVAAR server will only get failure feedback from the monitor in third STB 160 on DSLAM 142. The TVAAR can determine that other STB 150 is also consuming Ch1 without issues. The TVAAR can also determine that other STBs 156-158 on DSLAM 142 are not experiencing issues. After the TVAAR server correlates this information, it will determine that failure is originating in the access network or the CPE/Home Network associated with the third STB 160 on DSLAM 142. Since this STB feedback information arrives in real-time (or is pro-active), issues like this can be investigated before it is reported by the customer. This service provider can then check the statistics and configuration of the DSLAM and ATU-R and reconfigure these components if necessary. If these components are functioning normally, then the service provider can use the monitor to examine and reconfigure the STB/Home Network. Only then, if the problem is not identified, should the service provider consider conducting further investigation including physical inspection.

Figure 12:
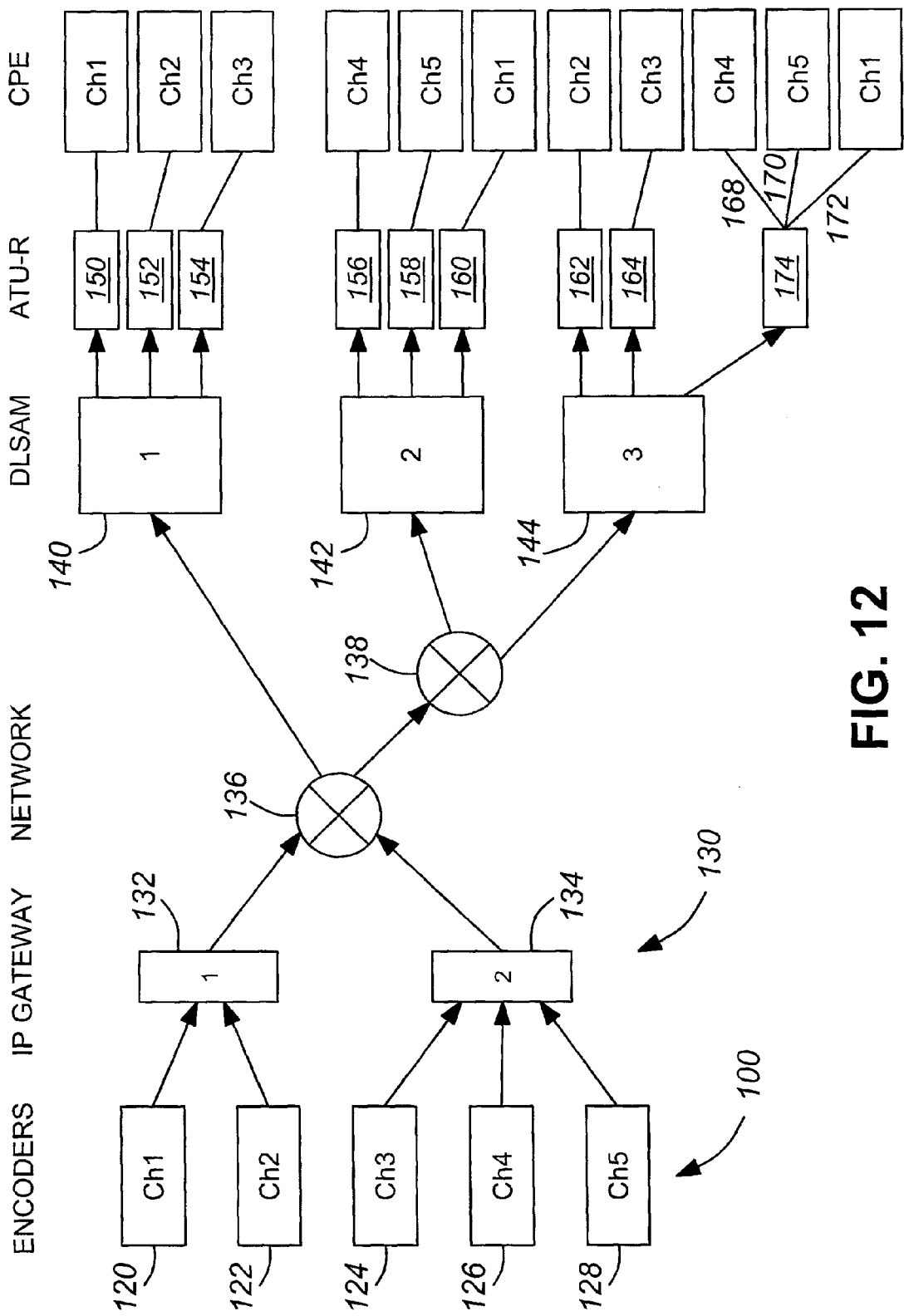

FIG. 12 represents a scenario with multiple STBs in one home. This involves a failure with second STB 170 of the third subscriber 174 on DSLAM 144 which is consuming Ch5. The TVAAR can determine that other STB 158 is also consuming Ch5 without issues. TVAAR can also determine that other STBs 162-168, 172 on DSLAM 144 are not experiencing issues. The TVAAR can further determine that the other subscribers using STBs 150-160 are operating normally. After the TVAAR server correlates this information, it will determine that the access network is functioning and the failure originates in the CPE/Home Network associated with the second subscriber STB 170. (Note: if two STBs report service issues, there is likely a problem with an in-home router, switch or hub and if three STBs report service issues there is likely a problem with the ATU-C or ATU-R. Since this STB feedback information arrives in real-time (or is pro-active, issues like this can be investigated before it is reported by the customer. This service provider can then check the statistics and configuration of the DSLAM and ATU-R and reconfigure these components if necessary. If these components are functioning normally, then the service provider can use the monitor to examine and reconfigure the STB/Home Network. Only then if the problem is not identified should the service provider consider conducting further investigation including physical inspection.

Although the invention has been described in connection with various illustrated embodiments, numerous modifications and adaptations may be made thereto without departing from the spirit and scope of the invention as set forth in the appended claims.

What is claimed is:

1. A method for supporting and quality monitoring digital Audio/Video (AV) services transmitted in an MPEG transport stream in an AV broadcast network implementing the ISO open system interconnect network model and having video decoding devices capable of decoding digital AV bitstreams, comprising:

receiving at a management server reports of detected anomalies from a plurality of video decoding devices that each perform one or more tests to detect anomalies in AV signals received thereby through the broadcast network in an MPEG transport stream during normal operation of said digital broadcast network, aggregating the reports from the plurality of the video decoding devices in a database, and automatically analyzing the aggregated reports to isolate faults responsible for detected anomalies and identify a probable source of the detected anomalies, wherein a plurality of content encoders provide digital AV bitstreams to respective video decoding devices that are connected to the broadcast network through a service delivery platform comprised of network elements including one or more of switches, middleware servers and routers, the AV bit streams being distributed over the broadcast network to the video decoding devices, the broadcast network including a plurality of digital subscriber access points each providing digital AV bitstreams to a set of video decoding devices associated therewith, wherein analyzing the aggregated reports comprises determining which of the content encoders, network elements, access points or video decoding devices is the probable source of the detected anomalies.

2. The method of claim 1 comprising:
determining, in dependence on the analyzed aggregated reports, if additional testing or more frequent polling is required of one or more of the video decoding devices and if so, sending a request to one or more selected video decoding devices and receiving corresponding test result results from the selected video decoding devices.

3. The method of claim 1 wherein analyzing the aggregated reports to isolate faults comprises applying sectionalization logic to correlate detected anomalies reported from video decoding devices connected to different locations of the broadcast network.

4. The method of claim 1 wherein if the aggregated reports indicate that a plurality of decoding devices are uniquely detecting anomalies on AV signals from an AV digital bitstream for a channel or content encoded at a specific content encoder, the specific content encoder is identified as the probable source of the detected anomalies.

5. The method of claim 1 wherein if the aggregated reports indicate that a plurality of decoding devices are uniquely detecting anomalies on AV signals from AV digital bitstreams for a plurality of channels that pass through a specific network element, the specific network element and its associated communications link is identified as the probable source of the detected anomalies.

6. The method of claim 1 wherein if the aggregated reports indicate that a plurality of decoding devices are uniquely detecting anomalies on AV signals from AV digital bitstreams for a plurality of channels that all pass through a specific router, the specific router is identified as the probable source of the detected anomalies.

7. The method of claim 1 wherein if the aggregated reports indicate that a plurality of decoding devices associated with a specific access point are uniquely detecting anomalies on AV signals from AV digital bitstreams that pass through the associated access point, the associated access point is identified as the probable source of the detected anomalies.

8. The method of claim 1 wherein if the aggregated reports indicate that a specific video decoding device is uniquely detecting anomalies, the specific video decoding device is identified as the probable source of the detected anomalies.

9. The method of claim 1 wherein the automatic analyzing is performed by an inference engine present on the management server.

10. The method of claim 1 wherein the video decoding devices are located at individual customer locations.

11. A centralized monitoring system for automatically detecting and locating problems in an IPTV (Internet Protocol Television) network having a plurality of network components for transmitting Audio/Video (AV) services transmitted in an MPEG transport stream to a plurality of customer video decoding devices that are capable of decoding digital AV bitstreams, the centralized monitoring system comprising:
a data collection system for receiving and storing reports of detected anomalies from a plurality of customer video decoding devices that each perform one or more tests to detect anomalies in AV signals received thereby through the IPTV network during normal operation of IPTV network; and
an inference engine for automatically analyzing a plurality of the reports to isolate faults responsible for detected anomalies and identify a probable source of the detected anomalies;
wherein the network components include: (i) a plurality of content encoders; (ii) a plurality of IP gateways receiving digital AV bitstreams from respective channel encoders; (iii) a plurality of ATM switches or routers receiving digital AV bitstreams from the IP gateways and routing the AV bitstreams through at least portions of the IPTV network; (iv) a plurality of digital subscriber line access multiplexers (DSLAMs) each receiving digital AV bitstreams through at least portions of the IPTV network and providing digital AV bitstreams to a set of the video decoding devices associated therewith, and wherein the inference engine is configure to: (a) determine if the plurality of reports indicate that a plurality of decoding devices are uniquely detecting anomalies in an AV digital bitstream for specific content encoded at a specific encoder, and if so, identify the specific encoder and content are identified as the probable source of the detected anomalies; (b) determine if the plurality of reports indicate that a plurality of decoding devices are uniquely detecting anomalies in AV digital bitstreams for a plurality of channels that pass through a specific IP gateway, and if so, identify the specific IP gateway as the probable source of the detected anomalies; (c) determine if the plurality of reports indicate that a plurality of decoding devices are uniquely detecting anomalies in AV digital bitstreams for a plurality of channels that all pass through a specific router, and if so, identify the specific router as the probable source of the detected anomalies; (d) determine if the plurality of reports indicate that a plurality of decoding devices associated with a DSLAM are uniquely detecting anomalies in AV digital bitstreams that pass through the associated DSLAM, and if so, identify the associated DSLAM as the probable source of the detected anomalies; and (e) determine if the plurality of reports indicate that a specific video decoding device is uniquely detecting anomalies, and if so, identify the specific video decoding device as the probable source of the detected anomalies.

12. The system of claim 11 wherein the data collection system and inference engine are implemented by one or more servers.

13. The system of claim 11 wherein the inference engine is configured to determine, in dependence on the analyzed plurality of reports, if additional testing or additional polling is required of one or more of the video decoding devices and if so, send test request to one or more selected video decoding devices, the data collection system being configured to receive and store the corresponding test result results from the selected video decoding devices.

14. The system of claim 11 wherein the inference engine is configured to, as part of automatically analyzing the plurality of the reports, apply sectionalization logic to correlate detected anomalies reported from video decoding devices connected to different locations of the IPTV network.

15. The system of claim 11 wherein the inference engine is configured to, as part of automatically analyzing the plurality of the reports, analyze for error signatures that are used by sectionalization logic to correlate detected anomalies reported from video decoding devices connected to different locations of the IPTV network.

\* \* \* \* \*